Patented Aug. 15, 1950

2,518,705

UNITED STATES PATENT OFFICE 2,518,705

AZOMETHINE DYES

Elmore Louis Martin, Wilmington, Del., assignor to E. I. du Pont de Nemours & Company, Wilmington, Del., a corporation of Delaware No Drawing. Application April 22, 1948, Serial No. 22,701

5 Claims. (Cl. 260—310)

This invention relates to new organic chemical compounds and more particularly to such compounds which have the properties of dyes. Still more particularly it relates to novel azomethine dyes.

An object of this invention is to provide a new class of organic compounds which have good tinctorial properties. A further object is to provide a new class of azomethine dyes which have general utility in the coloring of textiles and related materials. Still other objects will be apparent from the following description of the invention.

The azomethine dyes of this invention are magenta in color and have the following formula:

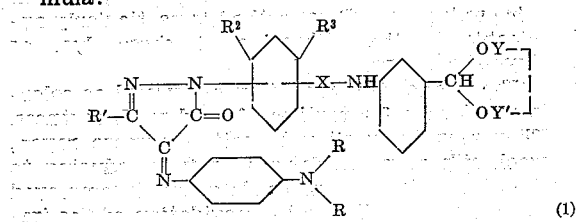

(1)

wherein R is an alkyl radical of 1 to 4 carbon atoms; R' is a hydrocarbon radical of 1 to 10 carbon atoms; $R^2$ and $R^3$ are hydrogen, halogen, methyl or methoxyl; X is CO or $SO_2$; Y and Y' are separately an alkyl group of 1 to 4 carbons and together may be joined to form a divalent saturated aliphatic hydrocarbon radical of 2 to 4 carbon atoms wherein 2 to 3 atoms only are in the chain between the two oxygen atoms.

In the preferred compounds of this invention, which have the following formula:

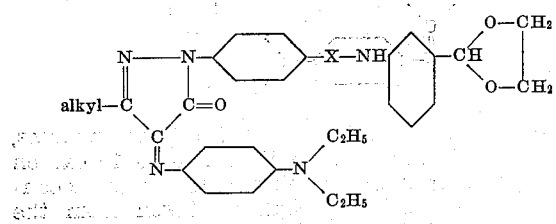

X is CO or $SO_2$, and alkyl contains 1 to 4 carbon atoms. In another class of preferred compounds, the phenylene radical between N and X is replaced by Cl—⟨benzene ring⟩

The dyestuffs of this invention can be prepared by reacting a lower acetal, for example, an ethylene glycol acetal of m-[p-(3-alkyl-1-pyrazolyl)-benzamido]benzaldehyde, e. g., m-[p-(3-methyl-1-pyrazolyl) - benzamido]benzaldehyde, with a p-aminodialkylaniline, e. g., p-aminodiethylaniline, in the presence of a mild oxidizing agent under alkaline conditions, e. g., exposed, light-sensitive silver halide, or potassium ferricyanide.

The acetals used as reactants with the p-aminodialkylanilines constitute the subject matter of Martin U. S. application Serial No. 667,125, filed May 3, 1946, now Patent No. 2,476,987. They are made by reacting a 5-acyloxypyrazole containing a benzene sulfonyl chloride or benzene carbonyl chloride group in the 1-position of the pyrazole ring with a lower acetal of m-aminobenzaldehyde. The reaction is preferably carried out at a temperature from —10° C. to 30° C. in the presence of a solvent or diluent medium which permits more intimate contact between the reactants. Suitable solvents for carrying out the amidation reaction include dioxane, acetone, methanol, ethanol, ethylene glycol diethyl ether, and mixtures of such solvents with water. The reactants may be in solution or suspension in the medium. A practical manner of carrying out the reaction consists in gradually adding a solution of the acid halide in a water-miscible solvent to an aqueous suspension of an aminoaldehyde or acetal in the presence of an alkali metal carbonate solution at a temperature from —5° C. to 5° C.

The acetals of the lower aliphatic alcohols, i. e., alcohols containing 1 to 4 carbon atoms, are preferred. Included in this class are acetals of aliphatic monohydric alcohols and dihydric alcohols in which the two hydroxyl groups are in 1,2- and 1,3-positions. Of these, because of their stability, ease of obtaining in crystalline form, and economy, the ethylene glycol acetals are preferred.

As exemplary procedures, the m-[p-(3-alkyl-1-pyrazolyl)benzamido]benzaldehyde ethylene glycol acetals can be prepared by reacting the p-(3-alkyl-1-pyrazolyl)-benzoyl chloride with m-aminobenzaldehyde ethylene glycol acetal. Similarly, p-(3-alkyl-1-pyrazolyl)benzenesulfonyl chloride can be reacted with m-aminobenzaldehyde ethylene glycol acetal to give the corresponding sulfonamide.

The invention is further illustrated by the following examples in which parts are by weight.

*Example I*

A dye is prepared from m-[p-(5-ethylcarbonato-3-methyl-1-pyrazolyl)benzamido] benzaldehyde ethylene glycol acetal, described in Example I of application Serial No. 667,125 by dispersion of 4.4 parts of the acetal and 100 parts of water containing 0.8 part of sodium hydroxide and 1 part of sodium carbonate. The mixture is warmed and 100 parts of 95% alcohol added. The solution is cooled to room temperature and to it is added 2 parts of p-aminodiethylaniline hydrochloride and 2 parts of sodium sulfite dissolved in 100 parts of water. A solution of 13.2 parts of potassium ferricyanide and 100 parts of water is then added dropwise with agitation. The reaction mixture is diluted with 300 parts of water and the soluble dye collected on a filter and dried. The crude dye, weighing 5.2 parts, is recrystallized from benzene. The recrystallized dye melts at 112–113° C. and has the formula:

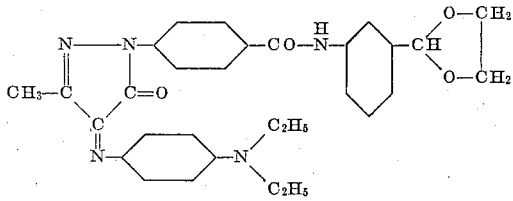

*Example II*

A dye is prepared from m-[3-(3-methyl-5-benzoxypyrazolyl)-4-chlorobenzenesulfonamido]-benzaldehyde ethylene glycol acetal prepared after the manner described in Example II of application Serial No. 667,125 by the procedure described in Example I. The crude dye obtained is purified by chromatographic separation of a methylene chloride solution of the dye in a column of lumina. The dye is completely adsorbed at the top of the column and is washed through with a methylene chloride solution containing 5% of methyl alcohol. A yellow impurity is eluted first, followed by the magenta dye. This dye is recovered, by evaporation of the solvent, in pure form and has the formula:

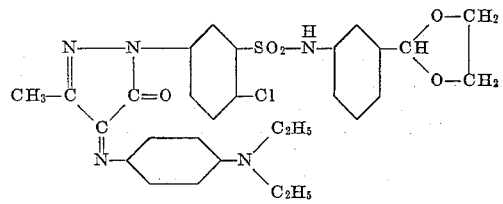

In addition to the dyes included in the examples, other carbonamides and sulfonamides falling under the invention are those wherein R' in Formula 1 is ethyl, propyl, butyl, hexyl, octyl, decyl, and phenyl; R² and R³ are hydrogen, halogen, methyl, and methoxyl. They can be prepared in like manner by substitution of the appropriate reactants. Examples of these compounds are dyes prepared as described in the examples from ethylene glycol acetals of m-[p-(3-methyl-5-ethylcarbonatopyrazolyl)-benzamido]benzaldehyde, m-[3-(3-methyl-5-benzoxypyrazolyl)-4-chlorobenzenesulfonamido]benzaldehyde, m-[3-3-phenyl-5-ethylcarbonatopyrazolyl)benzamido]benzaldehyde, m-[p-(3-methyl-5-ethylcarbonatopyrazolyl)-4-bromobenzamido]-benzaldehyde, m-[3-(3-methyl-5-ethylcarbonatopyrazolyl)-4-chlorobenzamido]benzaldehyde, m-[5-(3-methyl-5-ethylcarbonatopyrazolyl)-2,4-dichlorobenzamido]benzaldehyde, m-[3-(3-methyl-5-ethylcarbonatopyrazolyl)-4-methylbenzamido]benzaldehyde, and m-[3-(3-methyl-5-ethylcarbonatopyrazolyl)-4-fluorobenzamido]benzaldehyde, m-[p-(3-thienyl-5-ethylcarbonatopyrazolyl)benzamido]benzaldehyde.

Other color developers which can be reacted with the pyrazolyl benzamidobenzaldehyde acetals of this invention are p-aminodimethylaniline, p-aminodipropylaniline, and p-aminodibutylaniline.

The acetals may be ethylene glycol acetals, as illustrated in the examples. They may also be acetals of methyl, ethyl, n-propyl, isopropyl, or n-butyl alcohol, or they may be acetals of 1,2-propylene glycol, 1,3-propylene glycol, and 1,3-butylene glycol. For example, they may be used to color nylon fabric by introduction of the fabric into a bath containing the dye which has been reduced with sodium hydrosulfite and stirring at 80–90° C. for 30 minutes to 1 hour. After removal of the cloth from the dyebath, the color is obtained by immersion in 0.5% aqueous potassium dichromate solution. In this manner brilliant magenta and purple colors are obtained that show excellent fastness to washing. Although the vat process involving reduction is the preferred method of applying these dyes to textile fibers to achieve good penetration of color, they can also be applied directly, i. e., without prior reduction. This method is particularly applicable to the utilization of these dyes as throwster colors.

The dyes of this invention are useful as coloring materials for textiles of good wash fastness. They may be applied to cotton, viscose rayon, wool, silk or nylon fabrics by first reducing to the soluble form by methods generally employed for vat colors followed by reoxidation of the impregnated fabric with air or mild oxidizing agents.

As many widely different embodiments of this invention can be made without departing from the spirit and scope thereof, it is to be understood that the invention is not to be limited except as defined by the claims.

What is claimed is:

1. The compounds of the formula

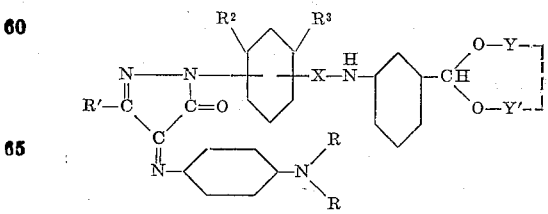

where R is an alkyl radical of 1 to 4 carbon atoms, R' is a hydrocarbon radical of 1 to 10 carbon atoms, R² and R³ are taken from the group consisting of hydrogen, halogen taken from the group consisting of chlorine and bromine, methyl and methoxy; X is a divalent radical taken from the group consisting of —CO— and —SO₂—; Y and Y' are separately the same and constitute alkyl radicals of 1 to 4 carbon atoms but together constitute an alkylene radical of 2 to 4 carbon atoms with 2 to 3 carbon atoms in the chain linking the two oxygen atoms.

2. The azomethine dyes of the formula

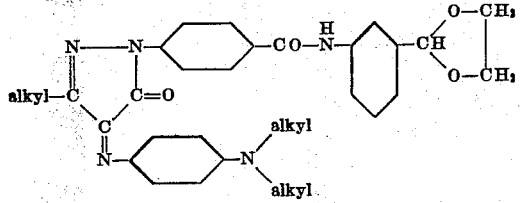

where alkyl contains 1 to 4 carbon atoms.

3. The azomethine dye of the formula

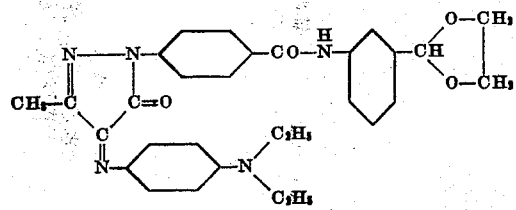

4. The azomethine dyes of the formula

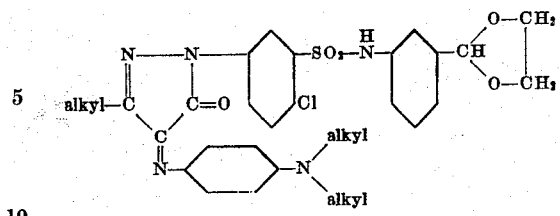

wherein alkyl contains 1 to 4 carbon atoms.

5. The azomethine dye of the formula

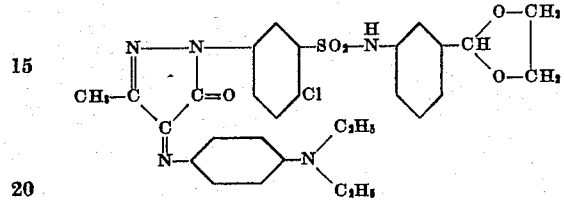

ELMORE LOUIS MARTIN.

No references cited.